(No Model.)

F. R. HUNT.
TUBULAR SCREW.

No. 324,768. Patented Aug. 18, 1885.

Witnesses.
A. Ruppert,
Franklin H. Hough

Inventor.
Frederic R. Hunt,
by Wm. G. Henderson,
Attorney.

United States Patent Office.

FREDERIC R. HUNT, OF LEAVENWORTH, KANSAS.

TUBULAR SCREW.

SPECIFICATION forming part of Letters Patent No. 324,768, dated August 18, 1885.

Application filed June 5, 1885. (No model.)

*To all whom it may concern:*

Be it known that I, FREDERIC R. HUNT, a citizen of the United States, residing at Leavenworth, in the county of Leavenworth and State of Kansas, have invented certain new and useful Improvements in Tubular or Hollow Screws; and I do hereby declare the following to be a full, clear, and exact description of the invention, such as will enable others skilled in the art to which it appertains to make and use the same.

My invention relates to screws, and has for its object to provide for locking the screw after it has been screwed home, so that it cannot be removed for the purpose of clandestinely and fraudulently gaining access to the vessel or receptacle which it is used to close or seal.

It frequently happens that vessels containing articles of merchandise are fraudulently opened during transportation, and at other times, for the purpose of pilfering their contents. My invention is particularly well adapted to guard against such losses, although it may be used for any purpose where it is desirable to lock the screw or bolt to its seat.

The invention will be hereinafter fully described and afterward claimed, and is illustrated in the accompanying drawings, in which—

Figure 1:
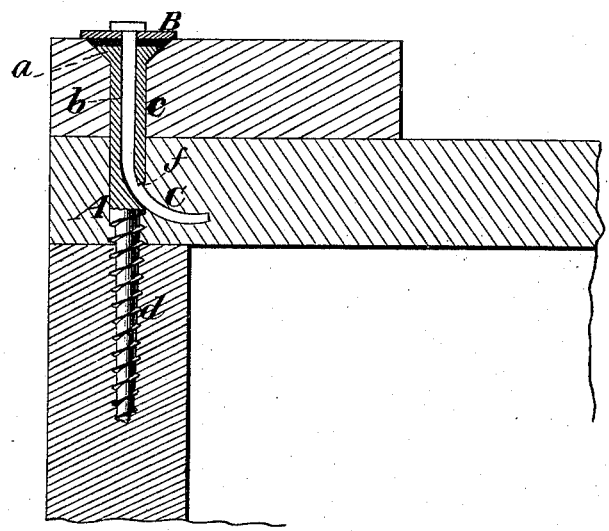
Figure 2:
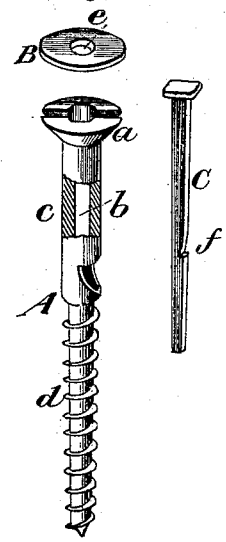
Figure 3:
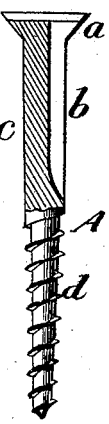
Figure 5:
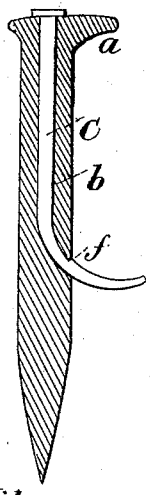
Figure 4:
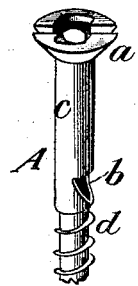

Figure 1 is a section of a corner of a box with the screw applied; Fig. 2, a perspective of screw, nail, and cap with parts in section; Fig. 3, a modified form of screw; Fig. 4, a perspective of screw with countersunk head. Fig. 5 is a vertical section of a spike with the notched nail applied to it.

In the drawings, the letter A designates a screw of any desired size and of ordinary construction, except that it is formed longitudinally with an opening or bore, $b$, which extends from the head $a$ of the screw along its shank or smooth portion $c$ to within a short distance of the threads $d$, and thence obliquely or laterally to the side of the screw, where it is open above, or at the upper portion of the threads of the screw, so as not to interfere therewith. It will be observed that the bore is in the thickest part of the screw, and that it does not interfere with the threads of the screw at all.

The screw is provided with a washer or cap, B, made separate therefrom and applied to its head to cover the usual nick made therein for the screw-driver, so as to prevent the screw from being unscrewed. This cap is held to its place by the head of the nail or pin C, which passes through the perforation $e$ therefor in the cap and down through the opening or bore $b$, and laterally into the box or base, which the screw penetrates.

In use the screw is first screwed to its place, the cap is placed on its head, and the nail or pin then introduced through the perforation in the cap and into the bore of the screw, and then driven down till its head lies closely on the cap. In driving the nail home its end strikes the obliqued or inclined bottom of the bore, and is by it deflected laterally through the lower end of the bore into the box or base. The nail, being thus curved or turned at an angle to its own length and that of the screw, takes a firm hold onto the box or base and cannot be withdrawn until straightened; and it also guards against the screw being turned. In order to effectually prevent the possibility of turning the screw, the cap is applied, as already described, so as to cover the nick in the head of the screw, and thus cover up the only means provided for applying a screw-driver to operate the screw.

A notch, $f$, may be formed in the nail or pin, so that when the nail is driven home the notch will come below the edge $g$ of the lateral portion of the opening in the screw, so that in an attempt to draw the nail the notch will engage with the edge $g$ of the screw, and thus prevent the withdrawal of the nail.

If desired, the opening $b$, instead of being in the form of a bore through the shank of the screw, may be in the form of a groove or recess formed in its side and extending down to the screw, as shown in Fig. 4; but the other form is preferred, as it more effectually prevents the withdrawal of the nail by affording a metal bearing, $g$, for the nail to strike against in any attempt at its withdrawal.

In applying the screws to a box, I prefer to nail the box in the ordinary way, and then apply cleats around the box at its sides, top, and bottom, at both ends, in the manner illustrated in Fig. 1, as applied across the side of one end, and then, after boring holes for the screws at the desired points, apply the screws, caps, and nails, as previously described.

By the construction described the screws are effectually locked, so that they cannot be removed for the purpose of pilfering during transportation.

Instead of using a cap of the form illustrated in Fig. 1, or even in connection therewith, the head of the screw may be countersunk, as shown, so that when the cap is omitted the head of the nail will lie in said countersink. The countersink may be of such depth that the top face of the nail-head will lie flush with the top head of the screw, or below it, as desired. The head of the nail, being across the nick in the screw-head, will serve as a cap, and will so close or divide it that a screw-driver cannot be inserted to turn the screw. Another advantage is that no tool can be applied to the head of the nail to withdraw it.

It is obvious that this construction can be used with the separate cap or without it, as may be desired, and that the screw-head can be made with a countersink or not, as desired.

As already indicated, the object of the head or cap lying across the nick or kerf in the screw-head is to close or obstruct the nick or kerf, so that a screw-driver cannot be inserted for the purpose of turning the screw. By extending the nick down through the screw-shank and out at the side the nail can be bent, as shown, so as to further guard against turning the screw, and it also assists the screw-threads in preventing the screw from being pulled out; but it will be observed that the opening in the screw-head and the head or cap lying across the nick or kerf in the head of the screw effectually prevent the application of a screw-driver.

It is obvious that the notched nail can be used with other forms of fastening devices—for instance, with such as a tubular bolt or spike.

Having thus described my invention and set forth its merits, what I claim is—

1. A screw formed with a nick in its head, and also having an opening extending through it at an angle to said nick, the lower end of said opening being deflected or turned at an angle to the length of the screw, whereby a pin may be inserted in said opening to intersect the nick in the head and have its point turned to prevent its extraction, substantially as described.

2. A nicked screw formed with a longitudinal opening terminating in its side, in combination with a nail or pin to extend through said opening, substantially as described.

3. The combination, with a screw or spike having a longitudinal hole terminating in its side, of a nail or pin to extend through the opening, said nail or pin being formed with a notch to engage with an edge of the screw or spike, substantially as described.

In testimony whereof I affix my signature in presence of two witnesses.

FREDERIC R. HUNT.

Witnesses:
F. E. HUNT, Jr.,
D. F. MINSLING.